United States Patent
Chamberlain

(10) Patent No.: US 7,124,402 B2
(45) Date of Patent: Oct. 17, 2006

(54) TESTING SOFTWARE MODULE RESPONSIVENESS TO STRING INPUT TOKENS HAVING LENGTHS WHICH SPAN A RANGE OF INTEGRAL VALUES

(75) Inventor: John Thomas Chamberlain, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/331,388

(22) Filed: Dec. 30, 2002

(65) Prior Publication Data

US 2004/0128650 A1    Jul. 1, 2004

(51) Int. Cl.
*G06F 9/44* (2006.01)
(52) U.S. Cl. .................................................. 717/124
(58) Field of Classification Search ........ 717/124–135; 714/1–57
See application file for complete search history.

(56) References Cited

U.S. PATENT DOCUMENTS

| 6,192,330 B1 * | 2/2001 | Nakamura .................... 703/13 |
| 2004/0205406 A1 * | 10/2004 | Kaliappan et al. ............. 717/4 |

OTHER PUBLICATIONS

Ostrand et al., The category-partition method for specifying and generating functional tests, Jun. 1988, Communication of the ACM, vol. 31, No. 6.*
Whittaker, James A. and Thomason, Michael G., *A Markov Chain Model for Statistical Software Testing*, IEEE Transactions on Software Engineering, vol. 20: 812-824, (Oct. 1994).
Whittaker, James A. and Poore, J. H., *Statistical Testing for Cleanroom Software Engineering*, Hawaii International Conference on System Sciences, 25th, Kauai: *IEEE Comput. Soc. Press*, vol. 2: 428-36 (1991).
Dewhurst, S., *Running Circles Round You, Logically*, C/C++ Users Journal, vol. 20: 51-56 (Jun. 2002).
McQuaid, Dr. Patricia A., *Improving Software Quality Through the Use of Complexity Metrics*, 1998, The European conference on Software Improvement, Farnham, UK; 7 pges.

* cited by examiner

*Primary Examiner*—Kakali Chaki
*Assistant Examiner*—Kou-Yi K. Chen
(74) *Attorney, Agent, or Firm*—Stephen T. Kaohane, Esq.; Carey, Rodriguez, Greenberg & Paul, LLP

(57) ABSTRACT

A software testing system for testing software module responsiveness to string input tokens having lengths which span a range of integral values. The system can include a range bounding processor configured to probe the software module across a communicative coupling with string input tokens having selected ones of the lengths without probing the software module with string input tokens of all of the lengths which span the range of integral values.

10 Claims, 3 Drawing Sheets

TESTING SOFTWARE MODULE RESPONSIVENESS TO STRING INPUT TOKENS HAVING LENGTHS WHICH SPAN A RANGE OF INTEGRAL VALUES

BACKGROUND OF THE INVENTION

1. Statement of the Technical Field

The present invention relates to the field of software testing and more particularly to testing the handling of character-string tokens of various lengths in software code.

2. Description of the Related Art

Software modules which process Internet protocols including the hypertext transfer protocol (HTTP), the lightweight directory access protocol (LDAP), the simple mail transport protocol (SMTP), the post office protocol version three (POP3) and so forth, typically perform a significant amount of parsing of character strings, and accordingly, include a proportionate segment of source code dedicated to the same. Most Internet protocols, however, do not constrain the length of string tokens involved in processing input data according to the respective protocols. Therefore, code which has been designed to process Internet protocol data must be prepared to handle string tokens of arbitrary lengths.

Yet, software engineers charged with the development of software modules intended to process Internet protocols often code to a "mental model" of what is to be considered a reasonable length of a string input token. Consequently, software engineers may neglect to design such code to properly handle unusually long, unusually short, or missing string tokens. This problem can be exacerbated by the fact that a given string token can be parsed or otherwise processed in many different layers of code within a software module. In this regard, each layer or combination of layers could have been developed by different software engineers.

Preferably, the testing process for such a software module ought to locate all code paths within the module which cannot gracefully handle unexpected string token lengths. In that regard, generally, the software module ought to be tested by varying the length of each individual string token that can be included in input data from zero to a desired upper bound. Yet, as any one given string token can be processed by multiple code paths in different layers of a software module, it can be extremely difficult for the tester of the module to identify all particular token lengths which will cause the software module to return different responses to the input data. In particular, where the developer of one layer has a competing view of "reasonably sized token" with the view of another developer of another layer in the software module, unexpected results can occur.

As an example, one code path in a software module can correctly handle a string token having a length which ranges from one (1) to five-hundred and twelve (512). Yet, the code path can crash for any other length, including zero (0). In another code path within the same module, however, a minimum length of ten (10) and a maximum length of sixty-four kilobytes (65,535) may be acceptable. Consequently, it would not be appropriate to test the software module using only a few, randomly selected lengths for string tokens. To do so would compromise the ability of the test to detect points of failure in particular code paths. Notwithstanding, the cost of testing every possible string token length from zero (0) to sixty-four kilobytes can prove too unwieldy or costly to be practical.

Improper handling of particular token lengths in a code path within a software module can cause the software module to crash or otherwise to fail in an ungraceful manner. In addition, faulty code paths can be vulnerable to buffer-overflow attacks and other forms of abuse by malicious agents. Buffer-overflow attacks have become a daily occurrence in the corporate information technology arena and have become a significant source of embarrassment and financial liability for software companies. Accordingly, there remains a long-felt, unsolved need for a software testing system and method in which faulty token-processing code paths can be efficiently identified within the time and resource constraints common to the software industry.

SUMMARY OF THE INVENTION

The present invention addresses the foregoing deficiencies of conventional software testing systems and provides a novel and non-obvious solution to the problem of testing the ability of a software module to process string input tokens having lengths which span a range of lengths without requiring a corresponding excessive consumption of computing resources. In common software practice, the length of a character string is expressed as the number of characters in the string, and must therefore be a positive integer greater than or equal to zero. In a preferred aspect of the present invention, a software testing system can be provided for testing software module responsiveness to string input tokens having lengths which span a range of integral values.

The system can include a range bounding processor configured to probe the software module being tested (hereinafter "the target module") across a communicative coupling with string input tokens, having selected or generated tokens with specially chosen lengths, rather than probing the target module with string input tokens of all of the lengths which are included in the range of integral values. Notably, the communicative coupling can be an Internet protocol request having a source address and port of the testing system, a destination address and port of the target module, and at least one string input token. The purpose of the range bounding processor is to produce a list of ranges, each bounded by an upper and lower value, each range representing a contiguous set of integral token lengths over which the response of the target module is identical to input data containing tokens of said lengths.

The range bounding processor can include a range-halving module programmed to identify changes in target module response states. Specifically, the changes can be identified by selecting ones of the lengths included in the range of integral values and communicating tokens of such selected lengths to the target module. Consequently, boundaries of subranges can be determined for lengths over which the target module response state is equivalent. In this way, response state change boundaries across the entire range of possible lengths for a string input token can be identified without testing every length value in the range.

It is to be understood that it is possible that not all target module response states will be discovered with this mechanism, as it is possible that a length L may trigger a state S1 surrounded by another state S2 which is identical for tokens of lengths immediately greater or lesser than L. This is an inherent limitation of any methodology that uses a sampling technique rather than an comprehensive test of all possible values. However, the present invention is designed for use in situations where limitations in time or resources preclude comprehensive tests, which is the common situation in the application testing industry; and the invention represents a clear improvement in efficiency and effectiveness at discovery of response states over a random sampling technique or other such prior art.

A method of producing a test script for testing software code configured to accept within an input string tokens of lengths chosen from a range of integral values, further can be provided in accordance with the inventive arrangements. The method can include establishing an upper and lower bound for a range of string token lengths and determining respective upper bound and lower bound target module response states for each of the bounds. If the upper bound and lower bound response states are not deemed equivalent, then the range can be partitioned into at least two subranges about an intermediate bound, wherein the two subranges can be respectively defined by the upper bound and the intermediate bound, and the lower bound and the intermediate bound. Additionally, an intermediate target module response state can be determined for the intermediate bound.

Notably, if the intermediate target module response state is deemed equivalent to the upper bound state, then it is assumed that there do not exist any state change boundaries within the subrange defined by the intermediate bound and the upper bound, and that subrange is not further examined. Otherwise, if the intermediate state and upper bound state are not equivalent, then it is manifest that there must exist at least one state boundary within the subrange. Accordingly, the partitioning of the subrange into successive subranges about successive intermediate bounds and comparison of successive intermediate bound states with successive upper bound states can be repeated in a recursive manner until all response state boundaries have been identified in the subrange defined by the original intermediate bound and the original upper bound.

Similarly, if the intermediate target module response state is deemed equivalent to the lower bound state, then it is assumed that there do not exist any state change boundaries within the subrange defined by the intermediate bound and the lower bound, and that subrange is not further examined. Yet, similar to before, if the intermediate state and lower bound state are not equivalent, then it is manifest that there must exist at least one state boundary within the subrange. As such, the partitioning of the subrange into successive subranges about successive intermediate bounds and comparison of successive intermediate bound states with successive lower bound states can be repeated in a recursive manner until all response state boundaries have been identified in the subrange defined by the original intermediate bound and the original lower bound.

It will be noted that if the upper and lower bounds of a subrange are determined to trigger equivalent responses from the target module, then it will be assumed that all intervening values will trigger the same response and therefore there will be no need to further examine that subrange. This assumption is paramount to the performance of the present invention. Still, as noted, it remains possible that there are in fact one or more non-equivalent target module response states corresponding to values within the subrange bounds. This limitation is deemed to be an acceptable compromise when considering the performance benefits of the present invention. However, it will be further noted that because the boundaries of adjacent subranges are always sequential integral values (that is, the high bound of subrange A is always exactly one less than the low bound of the adjacent subrange B), the operation of the present invention can ensure that there will be no target module response states between the states denoted by the boundaries of adjacent subranges.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for testing code paths in a target software module, wherein the code paths are sensitive to the lengths of string tokens in the input data sent to the module, and the object of the testing is to determine the response of the code paths to tokens of different lengths. In accordance with the inventive arrangements, a range bounding process can efficiently discover the varying responses of the code paths to different token lengths, and for each response state so discovered, efficiently determine the range of token lengths which will trigger that state. Based upon the results of the range bounding process, a list of token lengths which define the boundaries of the discovered response states can be written to a production test script for testing the software module, as an alternative to testing all possible string input token lengths across the full range of possible lengths.

Figure 1:
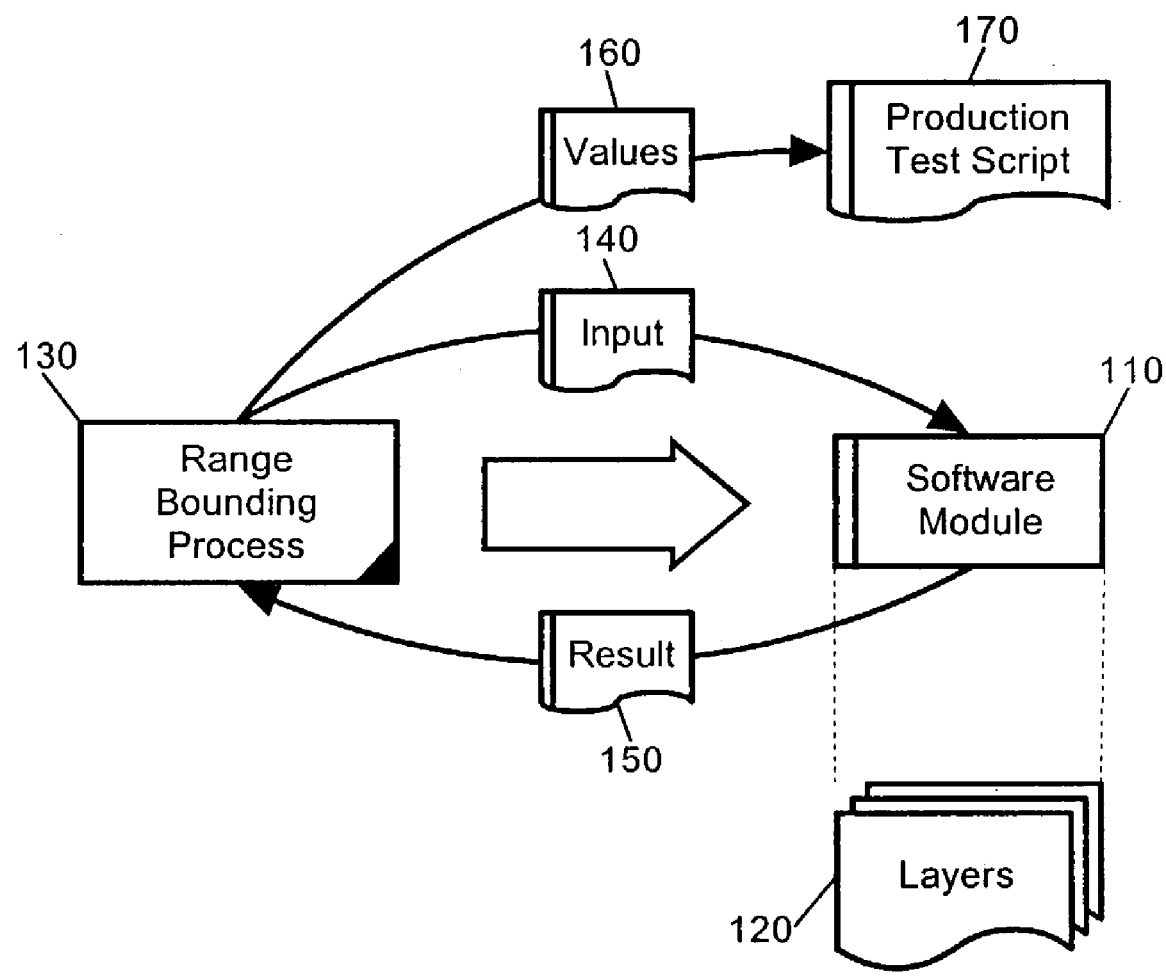
FIG. 1 is a schematic illustration of a software testing system configured to test code paths within one or more layers of a software module to ensure the proper handling of string tokens across a range of possible token lengths.

FIG. 1 is a schematic illustration of a software testing system configured to test code paths within one or more layers of a software module to ensure the proper handling of string tokens across a range of possible lengths. The software testing system can include a software module 110 formed of one or more programmatic layers 120. The software module 110 can implement one or more Internet protocols such as HTTP, LDAP, SMTP, POP3, and the like. Accordingly, the software module 110 can accept as input 140, an input string including one or more input string tokens. Based upon the received input 140, the software module 110 can produce a result 150 which can range from a programmatic result produced in accordance with the planned operation of the software module 110, to a error condition produced in consequence of an improperly handled string token length.

Ordinarily, to test the ability of the software module 110 to handle varying input string token lengths at each layer 120 of the software module 110, a software testing system would probe the software module 110 with input string tokens having incrementally larger and larger lengths in order to detect the responses produced by the software module 110 at each layer 120. Yet, an incremental search of this nature can be wasteful when testing a wide range of lengths. Accordingly, in accordance with the inventive arrangements, the range bounding process 130 can detect subranges of lengths within the continuum of input string token lengths, wherein each subrange defines a range of lengths which cause an equivalent response from one or more of the layers 120.

For example, in one exemplary module, a name token may be required. As is usual with public Internet specifications, the permissible lengths of the name token may not be explicitly constrained by the Internet specification which the module implements. In such a case, it remains the responsibility of the authors of the software module to determine a range of lengths deemed acceptable for the token in the context of its usage in the module, and to anticipate and properly respond to tokens whose lengths fall outside of the acceptable range. As noted, however, this responsibility is often complicated by the fact that a typical software module is comprised of layers of code, which may be designed or written by different authors who have imperfect or contradictory understandings of the acceptable token length, or who simply fail to adequately safeguard against lengths falling outside of the acceptable range.

Accordingly, in the exemplary module, a name token having zero length would cause an error condition at the top-most layer of the module in as much as a name token will be required as a parameter to the protocol request. Also, any name token which exceeds 1,024 will be considered an invalid input token by the top-most layer. In the second layer of code which parses the token, a name token having a length which ranges from five-hundred and thirteen (513) to one-thousand and twenty-four (1,024) may overwrite an array causing an outright crash of the software module. In the third layer of code, where a directory look-up function can be executed based upon the name token, a token having a length greater than two-hundred and fifty-seven (257) may be considered by that layer to be a name whose length exceeds the maximum permissible length in the directory.

In this exemplary module, response states will change when the name token length increases from 0 to 1, 256 to 257, 512 to 513, and from 1024 to 1025. The response can range from a successful result to a system crash. Another way of categorizing this behavior is to observe that the integral ranges 0-0 (rejected by top layer), 1–256 (success), 257–512 (rejected by third layer), 513–1024 (crashes second layer), and 1025 upwards (rejected by top layer) each represent a subrange for a particular response state, wherein the response state is equivalent for any value within its subrange, inclusive of its boundary values. In a conventional software testing system, discovering the response states would typically be performed by trying all possible lengths in order, from zero to some specified maximum.

One skilled in the art would find obvious that such an approach is inefficient. For instance, once the 512–513 transition point has been discovered, testing the lengths 514, 515, and so on will continue to yield the same response state until the 1024–1025 transition is reached. Consequently, the system and method of the present invention can provide a significantly more efficient mechanism for discovering the response state boundaries.

Through the utilization of a divide and conquer methodology, the bounding process 130 of the present invention can efficiently identify the response state subranges to produce a list of boundary values 160. Further, based upon the boundary values 160, the production test script 170 can test only the subrange boundaries to verify the behavior of the target module, for example from one version of the target module to the next. Lengths intermediate to boundary lengths can be ignored, thereby gaining a far more efficient use of testing resources. Should the production test script discover that the target module behavior has changed in a new version of the module, then the process can be re-executed to determine the new set of boundary values.

Figure 2:
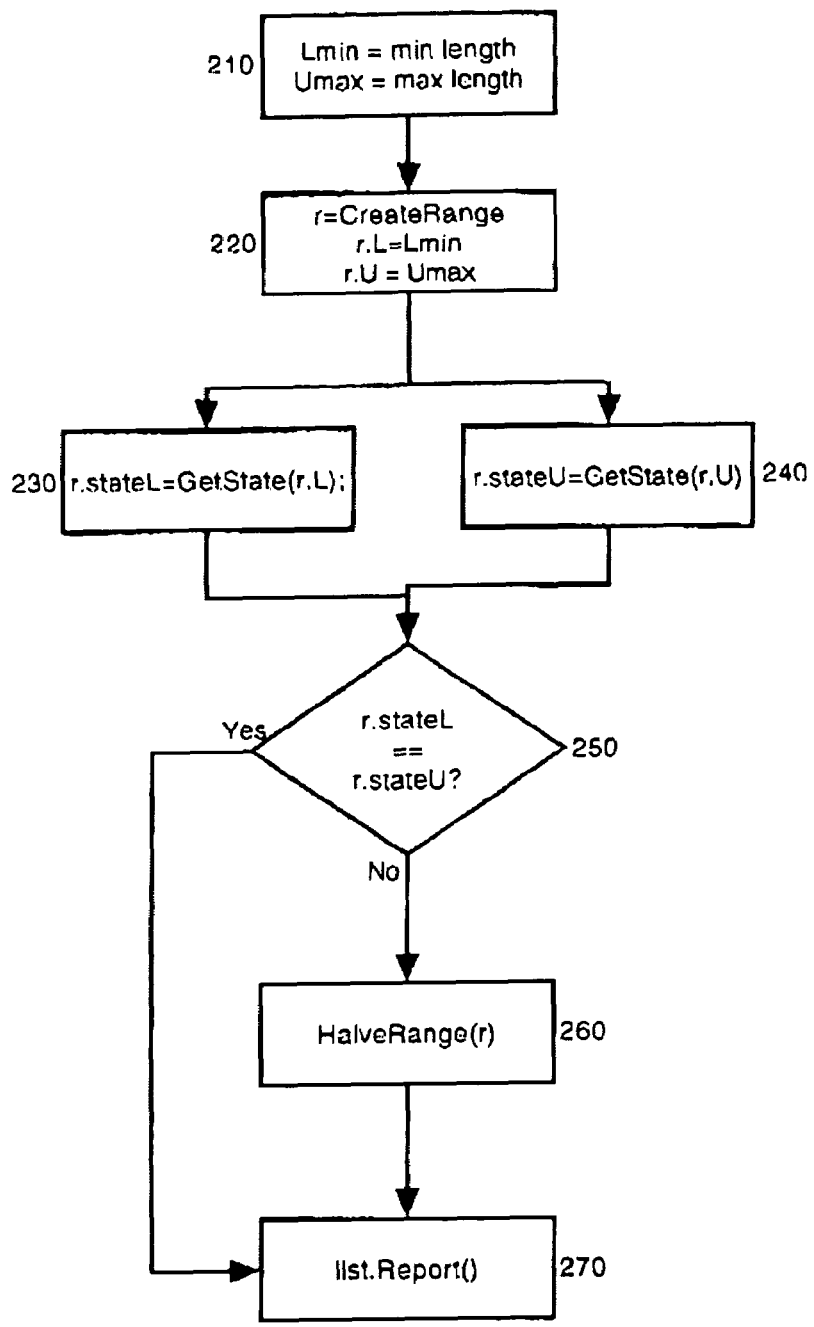
FIG. 2 is a flow chart illustrating a process of identifying response state boundaries for string token lengths in the software module of FIG. 1; and, FIG. 3 is a flow chart illustrating a halving methodology for use in the process of FIG. 2.

FIG. 2 is a flow chart illustrating a process of identifying string length processing boundaries in the software module 110 of FIG. 1. As will be recognized by one skilled in the art, the process of identifying string length processing boundaries across multiple code paths in a software module can be applied within a testing apparatus which can repeatedly call the target module with a template input line having a placeholder for the token under study. At the outset, in block 210 a maximum and minimum length can be specified for the outer limits of string token lengths that should be tested. The maximum and minimum lengths act as constraints on the overall operation of the invention, and would normally be chosen so that they are at or beyond the range of lengths that would be expected to produce the full set of target module response states. To begin the process, in block 220, the initial range r can be created with its lower bound equal to the specified minimum length and its upper bound equal to the specified maximum length, and the responsive state of the target module can be obtained in blocks 230 and 240 for both the lower and upper bounds of the range, respectively.

In decision block 250, if it is determined that the response state at the upper bound of the range is equivalent to the state at the lower bound of the range, the range halving process of block 260 can be bypassed as it appears there will be no response state boundaries to detect, and the process can proceed directly to block 270. In block 270, a report of all the response state boundaries found can be printed or written to storage. In the case where one arrives at block 270 from block 250, the list will be empty as both the lower and upper bounds of the range evoked the same response state.

Figure 3:
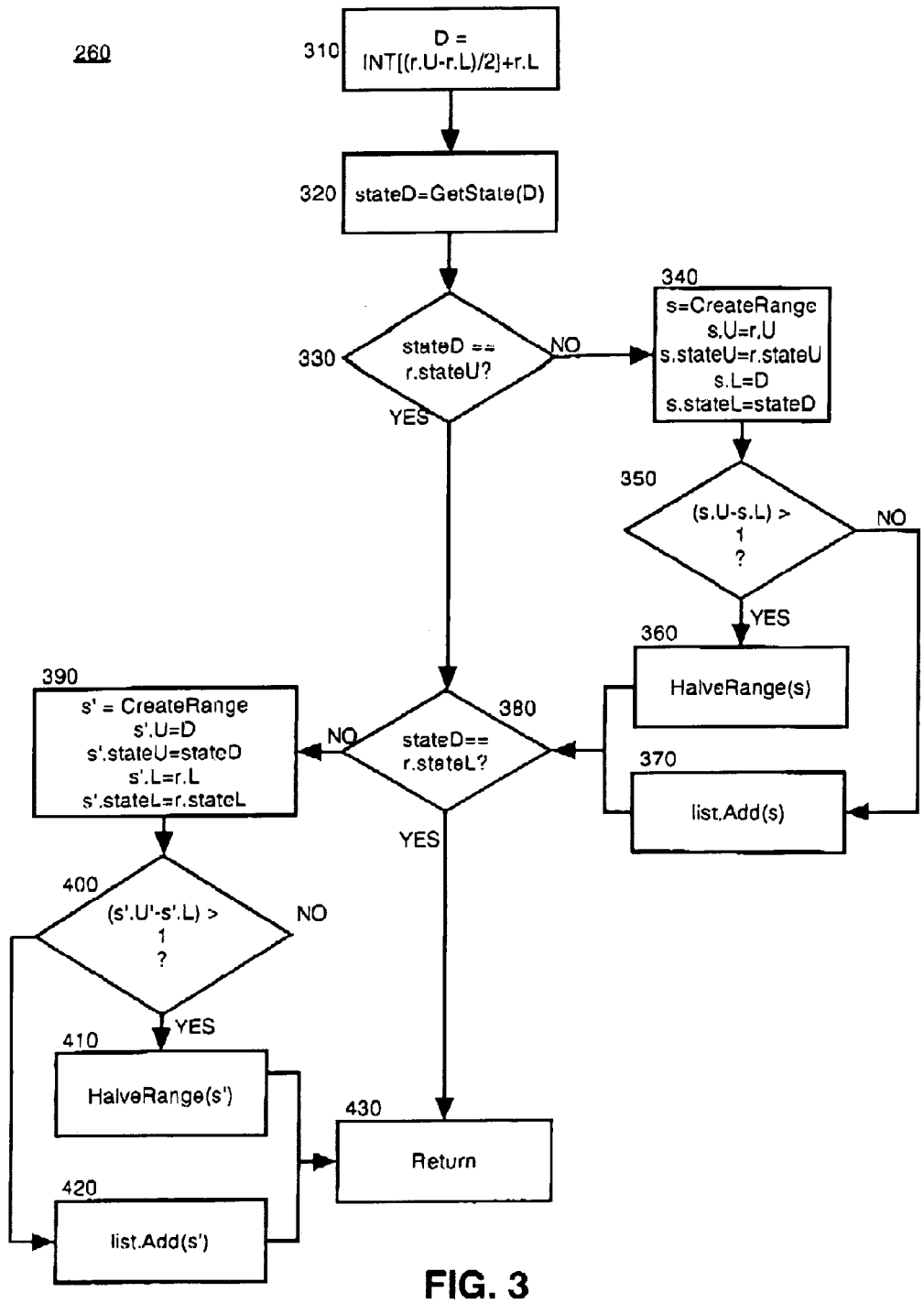

If, however, in decision block 250 it is determined that the state at the upper bound of the range r is not equivalent to the state at the lower bound of the range, it can be presumed that at least one state boundary exists in the continuum of the range. Accordingly, in block 260, a halving process can be applied to the range r, subdividing it at least two subranges. Each of the subranges can be searched individually in a recursive manner for response state boundaries as shown in FIG. 3. Upon return from the halving process in block 260, the invention can report in block 270 a list of all of the response state boundaries detected, which list can be used as input to a production test script as mentioned above. Importantly, though in the preferred aspect of the present invention a halving algorithm can be applied in which two subranges are produced by subdividing the range into two ranges of equal or nearly equal size, the invention is not to limited to the number or nature of divisions applied to search the entire range for state boundaries.

In any event, in the preferred aspect of the present invention, a halving process can be applied to the range, and the halving process can be applied to the subranges so produced recursively until it is determined that there are no more response states to be detected. To that end, FIG. 3 is a flow chart illustrating a recursive halving mechanism for use in block 260 of the process of FIG. 2. In a preferred albeit non-exclusive aspect of the present invention, the halving methodology can be recursively implemented so as to progressively divide the range into smaller and smaller subranges until it can be inferred that no state boundary exists between a chosen lower and upper bound of a sub-portion of the range. Specifically, in block 310, for a selected range with lower bound r.L and an upper bound r.U, an intermediate bound D can be computed in between the lower and upper bounds according to the equation $D=\text{int}((r.U-r.L)/2)+r.L$. At the bound D, the target module response state can be ascertained in block 320 by sending the target module an input string token having a length D and storing the response as stateD.

In decision block 330, it can be determined whether stateD is equivalent to the state at the upper bound—namely, r.stateU. If both states are equivalent, it can be presumed that no boundary changes in state will occur in the continuum between D and r.U. Accordingly, the continuum bounded by D and r.U is not further considered and the process can proceed directly to considering the lower portion of the range r in block 380. If however in block 330 it is determined that stateD differs from r.stateU, then a new subrange s is created in block 340 whose upper bound s.U and upper bound state s.stateU are set equal to the upper bound r.U and upper bound state r.stateU of the range r respectively, and whose lower bound s.L and lower bound state s.stateL are set equal to D and stateD respectively. In decision block 350 it can be determined whether the upper bond s.U and lower bound s.L are adjacent values, that is, the span of the subrange s is no greater than one and there do not exist any integral values between the bounds. If s.U and s.L are determined to be adjacent values, then because they are associated with different states, it can be presumed that s.U and s.L represent the two sides of a response state boundary. Accordingly, in block 370 the said state boundary can be inserted into the list of discovered boundaries, and the process continue with the investigation with the lower half of the range r in block 380.

By comparison, if in decision block 350 s.U and s.L are determined not to be adjacent values, it can be presumed that a state boundary lies somewhere within the subrange s. Consequently, in block 360 the halving process can be called recursively for subrange s. It will be understood by the skilled artisan that upon completing the recursively called halving process 360, the process can continue to decision block 380 with the knowledge that all response state boundaries lying within the subrange s will have been detected and inserted into the list of discovered response state boundaries. In blocks 380 through 420, the subrange defined by the lower bound r.L and the intermediate bound D can be inspected for state boundaries in equivalent manner to the process described for blocks 330 through 370. Specifically, in decision block 380 it can be determined whether the state at D is equivalent to the state at the lower bound of range r—namely, r.stateL. If so, it can be presumed that no state boundaries will occur in the continuum between D and r.L. Accordingly, the continuum bounded by D and r.L is not further considered and the process can return to the caller in block 430 as both of the divisions of the range r, one division bounded by D through r.U, and the other division bounded by D through r.L, have been processed.

If, however, in block 380 it is determined that stateD differs from r.stateL, then a new subrange s' is created in block 390 whose upper bound s'.U and upper bound state s'.stateU are set equal to D and stateD respectively, and whose lower bound s'.L and lower bound state s'.stateL are set equal to the lower bound r.L and lower bound state r.stateL of the range r respectively. In decision block 400 it can be determined whether the upper s'.U and lower bound s'.L are adjacent values, that is, the span of the subrange s' is no greater than one and there do not exist any integral values between the bounds. If s'.U and s'.L are determined to be adjacent values, then because they are associated with different states, it can be presumed that s'.U and s'.L represent the two sides of a response state boundary. Accordingly, in block 420 the state boundary can be inserted into the list of discovered boundaries, and the process return to the caller in block 430, as both divisions of the range r have been processed.

By comparison, if in decision block 400 s'.U and s'.L are determined not to be adjacent values, it can be presumed that a state boundary lies somewhere within the subrange s'. Consequently, in block 410 the halving process can be called recursively for subrange s'. It will be understood by the skilled artisan that upon completing the recursively called halving process 410, the process can continue to block 430 with the knowledge that all boundaries lying within the subrange s' will have been detected and inserted into the list of discovered boundaries.

It will be apparent to the skilled artisan that certain modifications can be made to the foregoing process without materially affecting the principle of the operation of the invention. For instance, whereas in the foregoing description the invention processes subranges to the high-side of intermediate bounds before processing subranges on the low-side, an implementation could equally well give preference to low-side subranges. Also, variations in the generation of subranges are possible. Ranges could be divided into subranges on a different basis than the halving module described herein; for example by dividing into non-equal portions or more than two portions. Also, the division of a range into subranges about an intermediate bound could occur before determining the state of the intermediate bound, rather than after determining the state of the intermediate bound, which is the optimized implementation in the preferred embodiment.

Also, subranges and the list of discovered boundaries could each be implemented in software in a variety of ways, for example as an array of elements, a linked list of objects, or other common data structures; or each could be implemented in hardware as electronic or mechanical devices. Also, variations in the reporting or writing to storage of the detected response state boundaries are possible, for example, whereas in the preferred embodiment described herein the boundaries are reported as a list of adjacent value pairs, each pair representing the two sides of a state boundary, the result could also be reported as a list of subranges defined by upper and lower bounds, each subrange representing a continuum over which the response state is identical.

It will also be apparent to the skilled artisan that the scope of the present invention can also be applied to testing other types of input data besides the string tokens described herein. In that regard, the operation of the present invention can be applied to any case where the input data has any attribute that can vary over a range of sequential integral values. Examples can include: numeric tokens, where the integral attribute is the value of the numeric token; and arrays or lists of objects, where the integral attribute is the number of such objects.

Further, the invention can be used in any case where the integral value is an attribute of the behavior of the testing process. Some examples include iterative testing of a module, where the integral attribute is the number of tests or test cycles performed; time dependencies, where the integral attribute is related to the time interval between testing operations, such as the time delay between operations in a test script, or the frequency of testing operations, such as the number of operations performed per unit of time; and performance dependencies, such as the number of tests being performed simultaneously.

Yet further, the invention can be used in any case where the integral value is an attribute of the testing environment, or of the target module itself. Some examples include resource constraints, such as memory or disk space allocated for the target module, where the integral attribute represents the extent of such resource; and constraints upon the activity of the target module, such as the total number of requests which the target module will allow, or the maximum number of simultaneous requests the target module will allow.

Finally, it will also be apparent to one skilled in the art that the scope of the present invention should not be limited merely to testing Internet systems. Rather, the present invention can test any target system which is responsive to an implementation of the invention. Moreover, it will be further apparent to the skilled artisan that the scope of the invention is not limited to testing target systems realized in software. Target systems could also be realized in hardware or any combination of hardware and software.

In that regard, the present invention can be realized in hardware, software, or a combination of hardware and software. An implementation of the method and system of the present invention can be realized in a centralized fashion in one computer system, or in a distributed fashion where different-elements are spread across several interconnected computer systems. Any kind of computer system, or other apparatus dapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A method for testing software code programmed to accept as input string tokens of lengths which span a range of integral values, the method comprising the steps of:
   partitioning the range of integral values at a partition point defining upper and lower subranges, each of said subranges having upper and lower bounds;
   for each of said subranges, determining response states for the software code at said upper and lower bounds;
   if said response states at said upper and lower bounds are equivalent, discarding said subrange; and,
   if said response states at said upper and lower bounds are not equivalent, performing said partitioning, determining and discarding steps for said subrange,
   the partitioning, determining and discarding identifying state boundaries for said subrange.

2. A method of producing test data for a test script for testing software code configured to accept as input string tokens of lengths which span a range of integral values, the method comprising the steps of:
   establishing an upper and lower bound for the range and determining respective upper bound and lower bound target module response states for each of said upper and lower bounds of the range;
   establishing an intermediate bound between the said upper and lower bounds;
   determining the target module response state for said intermediate bound;
   if said intermediate bound state is not equivalent to said upper bound state, creating a new subrange defined by said upper bound and said intermediate bound;
   if said intermediate bound and said upper bound are not adjacent values, repeating said partitioning steps for said subrange and its successive subranges until all state boundaries have been identified in said subrange;
   if said intermediate bound state is not equivalent to said lower bound state, creating a new subrange defined by said lower bound and said intermediate bound; and,
   if said intermediate bound and said lower bound are not adjacent values, repeating said partitioning steps for that subrange and its successive subranges until all state boundaries have been identified in said subrange,
   the partitioning, determining and discarding identifying state boundaries for said subrange.

3. The method of claim 2, wherein said step of partitioning comprises the step of partitioning said range into exactly two subranges about an intermediate bound, said two subranges respectively defined by said upper bound and said intermediate bound, and said lower bound and said intermediate bound.

4. The method of claim 2, further comprising the step of computing said intermediate bound by dividing the range in half.

5. The method of claim 3, wherein said computed intermediate bound comprises the sum of said lower bound and a rounded down whole value of one half the difference between said upper and lower bounds.

6. A machine readable storage having stored thereon a computer program for producing test data for a test script for testing software code configured to accept as input string input tokens of lengths which span a range of discrete values, said computer program comprising a routine set of instructions for causing the machine to perform the steps of:
   establishing an upper and lower bound for the range and determining respective upper bound and lower bound target module response states for each of said upper and lower bounds of the range;
   establishing an intermediate bound between the said upper and lower bounds;
   determining the target module response state for said intermediate bound;
   if said intermediate bound state is not equivalent to said upper bound state, creating a new subrange defined by said upper bound and said intermediate bound;
   if said intermediate bound and said upper bound are not adjacent values, repeating said partitioning steps for said subrange and its successive subranges until all state boundaries have been identified in said subrange;
   if said intermediate bound state is not equivalent to said lower bound state, creating a new subrange defined by said lower bound and said intermediate bound; and,
   if said intermediate bound and said lower bound are not adjacent values, repeating said partitioning steps for that subrange and its successive subranges until all state boundaries have been identified in said subrange.

7. The machine readable storage of claim 6, wherein said step of partitioning comprises the step of partitioning said range into exactly two subranges about an intermediate bound, said two subranges respectively defined by said upper bound and said intermediate bound, and said lower bound and said intermediate bound.

8. The machine readable storage of claim 6, further comprising the step of computing said intermediate bound by dividing the range in half.

9. The machine readable storage of claim 8, wherein said computed intermediate bound comprises the sum of said lower bound and a rounded down whole value of one half the difference between said upper and lower bounds.

10. A machine readable storage having stored thereon a computer program for testing software code programmed to accept as input string tokens of lengths which span a range of integral values, said computer program comprising a routine set of instructions for causing the machine to perform the steps of:

partitioning the range of integral values at a partition point defining upper and lower subranges, each of said subranges having upper and lower bounds;

for each of said subranges, determining response states for the software code at said upper and lower bounds;

if said response states at said upper and lower bounds are equivalent, discarding said subrange; and, if said response states at said upper and lower bounds are not equivalent, performing said partitioning, determining and discarding steps for said subrange.

* * * * *